May 17, 1938.  J. MIHALYI  2,117,972
CAMERA SHUTTER RELEASE
Filed Nov. 28, 1936
FIG.1.
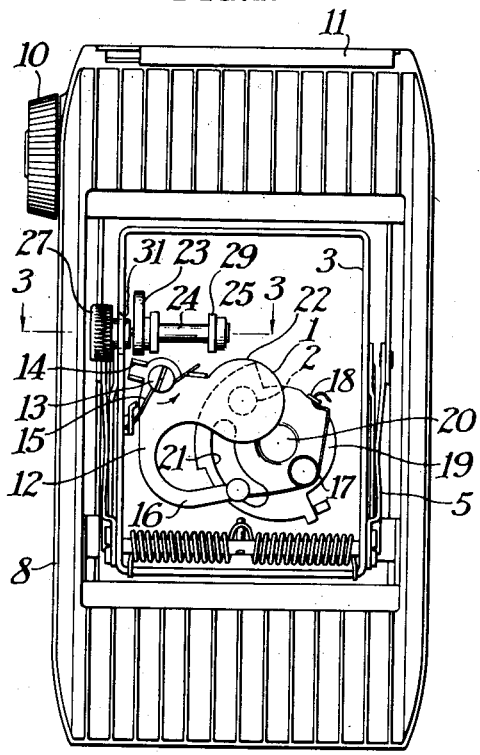
FIG.3.
FIG.5.
FIG.2.
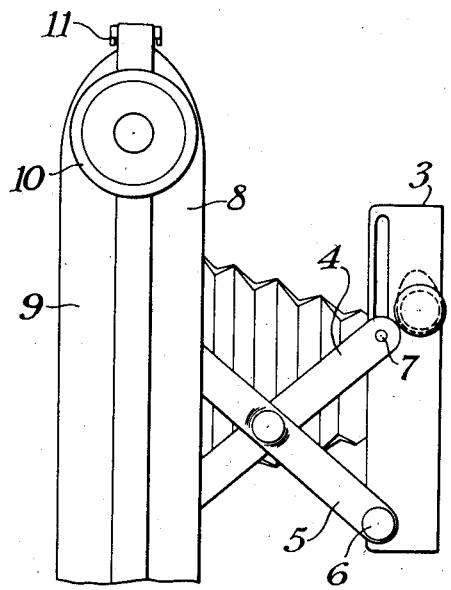
FIG.4.
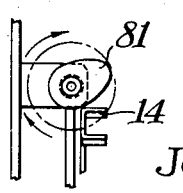
FIG.6.
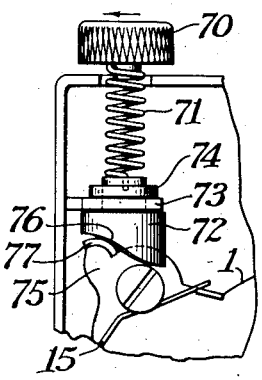
FIG.7.
Joseph Mihalyi
INVENTOR.
BY Newton M. Perrins,
Donald H. Stewart
ATTORNEYS Patented May 17, 1938

2,117,972

UNITED STATES PATENT OFFICE 2,117,972

CAMERA SHUTTER RELEASE

Joseph Mihalyi, Rochester, N. Y., assignor to Eastman Kodak Company, Rochester, N. Y., a corporation of New Jersey Application November 28, 1936, Serial No. 113,199

11 Claims. (Cl. 95—53)

This invention relates to photography, and more particularly to shutters for photographic cameras.

One object of my invention is to provide a shutter release which is easy to operate and with which the shutter can be released without undue jarring. Another object of my invention is to provide a shutter release for cameras in which the finger piece is resiliently connected to the mechanism operating piece, so that the former is not adapted to transmit vibrations to the latter. Another object of my invention is to provide a shutter with a shutter releasing knob adapted to be turned in releasing the shutter mechanism. Still another object of my invention is to provide a knob which is adapted to be turned so as to store up energy in a flexible member, enabling the flexible member, when sufficient energy has been stored therein, to overcome the inertia of the camera mechanism to operate the camera mechanism. Another object of my invention is to provide a shutter release knob which may be turned with a rotative movement to turn a shutter mechanism operating cam, movement of the knob being transmitted to the cam by means of a flexible member in which energy may be stored up by the winding movement. Other objects will appear from the following specification, the novel features being particularly pointed out in the claims at the end thereof.

In cameras, and particularly in small, light weight cameras, it is very easy for an operator to shake or move the camera during the moment of exposure, and thus produce blurred and indistinct negatives. It frequently happens that where the shutter triggers are of the usual type, which must be depressed so as to store up and release energy in a master member spring, at the point where the trigger slips off the master member there is liable to be a shake or jar which may spoil the picture.

My invention is particularly directed to cameras employing known types of shutters to overcome the objections above referred to.

Coming now to the drawing wherein like reference characters denote like parts throughout:

Fig. 1 is a front plan view of a camera showing a shutter releasing mechanism constructed in accordance with and embodying a preferred form of my invention. In this figure the shutter cover has been removed to expose the shutter mechanism.

Fig. 2 is a fragmentary side elevation of the camera shown in Fig. 1 with the shutter cover also removed.

Fig. 3 is a fragmentary detail section through a shutter releasing mechanism constructed in accordance with and embodying a preferred form of my invention.

Fig. 4 is a fragmentary end elevation partially in section showing parts of the shutter releasing mechanism shown in Fig. 3, this section being taken on line 4—4 thereof.

Fig. 5 is a fragmentary detail section of a second embodiment of my invention.

Fig. 6 is a fragmentary plan view of still another embodiment of my invention.

Fig. 7 is a fragmentary view similar to Fig. 4, but with the shutter releasing cam mounted to rotate instead of to merely oscillate, as is the case in Fig. 4.

While I have illustrated, as a preferred form of my invention, a shutter release applied to a shutter of a simple known type, the shutter mechanism itself forms no part of the present invention, as obviously my release mechanism is not only adapted for the shutter mechanism shown in the drawing, but is adapted to operate many different types of known shutter structures.

My invention broadly comprises mounting a shutter releasing member on the end of a flexible member in which more or less energy may be stored by turning the shutter release member so that when sufficient energy has been stored in the flexible member, the shutter mechanism operating member will cause the shutter mechanism to function.

In accordance with Fig. 1 a shutter constructed in accordance with my invention may comprise shutter mechanism designated broadly as 1 which is adapted to open and close an exposure aperture 2 to permit light to pass for making an exposure on a light-sensitive film in a well known manner. The shutter mechanism may be mounted in a shutter casing 3, and in this instance the shutter casing 3 is carried by a pair of lazy tongs 4 and 5 pivotally and slidably attached at 6 and 7 to the shutter casing. The lazy tongs 4 and 5 are similarly attached to the inside of the camera body 8 which may have the usual removable back 9, winding key 10 and latch 11 for holding the camera back in place.

In the shutter shown in Fig. 1, an exposure may be made by causing the master member 12 to move about its pivot 13 through the depression of the lug 14. A spring 15 normally holds the shutter in the position shown in Fig. 1.

When, however, the lug 14 is depressed, the arm 16 carrying one end of a hairpin spring 17 causes the opposite end 18 of the spring to move the shutter 19 about its pivot 20 a sufficient distance for the slot 21 in the shutter blade to pass the exposure opening 2 to admit light thereto.

Thus, during the exposure the cover blade 22 is moved away from the opening 2 so that the exposure is made through the slot 21. However, when the pressure on the lug 14 is released, the cover blade 22 will lie over the top of the aperture 2 permitting the shutter member 19 to return to its full line positions in Fig. 1 without again exposing the film. This shutter mechanism is well known in the art.

Coming now to my invention, in order to actuate the shutter mechanism I provide a cam member 23 which, as best shown in Fig. 3, is carried on the end of a tubular shaft 24. On the end of this shaft there is a suitable clamping block 25 which attaches a flexible wire cable 26 to the tube 24, and since this cable 26 is likewise attached to the shutter releasing member 27, it forms a flexible connection between the shutter releasing member and the mechanism releasing cam 23.

The tubular shaft 24 is mounted in suitable bearings 28, being free to revolve or turn therein. These bearings may be carried by a bracket 29 attached to the plate 30 which forms a portion of the shutter casing 3. With the structure above described, the shutter release, which in this case is a knob 27, may be turned. This turning movement causes the flexible wire 25 to be put under tension, and as the tension is gradually applied to the flexible wire, it tends to wind up, thus storing up energy in the cable which will be transmitted to the cam 23 just as soon as the energy is sufficient to overcome the inertia of the camera mechanism. I have found that a braided wire cable is sufficiently stiff to support the shutter release 27 in approximately the proper position, and yet is sufficiently resilient to require considerable angular movement of the knob 27 before the cam 23 is actually moved. By reference to Figs. 1 and 3 it will be noticed that the knob 27 projects through an opening 31 in the shutter casing, which is of sufficient size to permit considerable lateral movement of the knob relative to the shutter casing. Thus, an operator may move the knob through a limited distance without in any way tending to shake the shutter as an exposure is being made.

With certain types of shutter mechanism, it is desirable to move the shutter operating member a somewhat greater distance than the mechanism operating cam. Accordingly, in Fig. 5 I have shown a second embodiment of my invention in which the shutter operating member 57 is attached to a rigid shaft 58, this shaft terminating in a head 59 which is apertured at 60 to receive one end of a coiled spring 61, the other end of which may project into an aperture 62 carried by the operating cam 63. With this embodiment of the invention, as the shutter operating member 57 is turned, the head 59 turns, tending to wind up the spring 61, this winding movement occurring until the energy stored in the spring is sufficient to overcome the inertia of the camera parts, and to cause the cam 63 to actuate these parts to make an exposure.

It is a relatively simple matter to adjust the flexible member or to provide a flexible member which is sufficiently flexible to permit some movement of the operating member relative to the camera mechanism without operating the parts, and to permit energy to be stored in the flexible connection.

With the embodiment of my invention shown in the first three figures, I have found that a shutter can be made in which a movement of perhaps about 90° is sufficient to operate the mechanism cam.

With the embodiment of my invention shown in Fig. 5, a somewhat greater angular movement of the shutter operating mechanism is necessary, and I have found that the operating knob can be very readily turned from 270° to 360°, with but little effort and with but little chance of causing vibration of the shutter parts as the exposure is being made. It is purely a matter of selection how far the knob must be turned, and this can be controlled by the size, flexibility, shape and weight of the flexible connection between the shutter operating member and the mechanism cam.

In Fig. 6 I have shown a slightly different form of my invention, in which a shutter operating knob 70 is attached to a flexible connection 71 which in turn is attached to a mechanism cam 72, this cam passing through the bearing 73 and being held therein by the washer 74. Thus, when the operating member 70 is turned, the spring 71 is placed under tension, and the mechanism cam 72 will be turned when the tension in the flexible spring 71 has become sufficiently great to overcome the inertia of the master member 75. In this case the cam edge 76 contacts directly with an upstanding flange 77 on the master member.

In the forms thus far described I have preferred to make the shutter operating member so that it may be turned in one direction to cause the shutter to be released, and upon release of the shutter operating member it will turn in a reverse direction to a normal position of rest. This return movement is caused by the spring of the master member.

In some cases it is more convenient to provide a shutter releasing mechanism which must be actually rotated in one direction and which need not turn in a reverse direction as an exposure has been made. Accordingly, in Fig. 7 I have shown such a construction. In this case the mechanism cam 81 is adapted to contact with an upstanding lug 14 on the shutter master member. Each time an exposure is made, the cam 81, which may be turned by a flexible connection from a shutter operating member similar to those shown in Figs. 3 or 5, for instance, is turned in the direction shown by the arrow, so that it will move the master member lug 14 until the cam slips off this member, permitting the master member to return to its normal position of rest. During the next exposure the shutter operating member, which is preferably a knob, is turned again the same direction, so that the cam 81 will again engage and operate the upstanding lug 14. Thus, if desired, the shutter operating member may be made either rotatable or oscillatable.

In the following claims, where I refer to an operating member rotating a mechanism cam, I mean the word "rotating" to include not only a shaft which actually turns 360° or more, but a shaft which may turn 360° or less, since it is obviously immaterial, from the standpoint of successful operation of the shutter, whether or not the shutter operating member is oscillated or rotated in order to make an exposure. It should be noted, however, that in all forms of my invention there is a definite flexible connection between the shutter operating member and the shutter mechanism. This is desirable for quite a number of reasons.

First, by having a flexible connection which must be more or less "wound up" in making an exposure, this taking up of lost motion eliminates the usual causes for shutter shake, since it eliminates the transmission of force from the operator's finger to the shutter at the moment an exposure is made. With the embodiments of my invention above described, the operator, if the shutter operating member is turned slowly, will not be aware of the exact fraction of a second at which the exposure will occur, and moreover, when this exposure does occur, the flexible connection takes up a large part of the sudden shock which would otherwise occur when the master member is operated.

Second, since the operating member can move a reasonable distance laterally without transmitting motion to the shutter, it is immaterial whether or not the operator's hand shakes slightly when the picture is being taken.

Third, the flexible connection between the shutter release and the mechanism cam in all of the different forms shown as various embodiments of my invention, not only requires that a certain amount of energy be stored up in the flexible connection before the exposure is made, but also permits continued movement up to a limited extent, of the shutter operating mechanism after the exposure has occurred, thus making a resilient cushion on the end of the stroke, as well as cushioning the beginning of the stroke which makes the exposure.

While I have illustrated a number of different embodiments of my invention, it is obvious that this type of flexible release can be applied to a great many of the known types of shutters already on the market, and I do not consider my invention limited to the forms illustrated in the drawing and described in this specification, but only by the terms of the claims attached hereto.

What I claim is:

1. In a camera shutter, the combination with an apertured shutter casing, of a torsionally resilient rotatable shaft projecting through the aperture, means on the end of the resilient shaft outside of the casing for turning the shaft, and mechanism inside of the shutter casing with which the shaft is adapted to cooperate for operating the shutter.

2. In a camera shutter, the combination with an apertured shutter casing, of a torsionally resilient rotatable shaft projecting through the aperture and including a spring, mechanism inside the shutter casing, operable connections between the spring and mechanism for actuating the shutter and means carried by the resilient shaft exteriorly of the shutter casing for applying a torque to the spring.

3. In a camera shutter, the combination with an apertured shutter casing, of a torsionally resilient rotatable spring shaft projecting through the casing, a knob on the shaft outside of the casing for applying a torque to the shaft, mechanism inside the casing for producing an exposure, and cooperative elements on the shaft and included in the mechanism for operating the latter when a torque is applied to the spring shaft by the knob.

4. In a shutter for photographic cameras, the combination with an apertured shutter casing, of a torsionally resilient shaft rotatably mounted in the shutter and projecting through the aperture therein, said shaft comprising spring metal capable of bending, a shutter releasing member fixedly attached to the shaft exteriorly of the shutter casing, a cam connected fixedly to the shaft interiorly of the casing, shutter mechanism for making an exposure mounted in the casing and operable by the cam, whereby a torque applied manually to the shutter release and transmitted by the flexible shaft may operate the shutter mechanism.

5. In a shutter for photographic cameras, the combination with an apertured shutter casing, of a torsionally resilient shaft rotatably mounted in the shutter and projecting through the aperture therein, said shaft comprising spring metal capable of bending, a shutter releasing member fixedly attached to the shaft exteriorly of the shutter casing, a cam connected fixedly to the shaft interiorly of the casing, shutter mechanism for making an exposure mounted in the casing and including a spring which must be set and released, said mechanism also including a spring setting and releasing lever lying in the path of the cam whereby a torque applied to the spring shaft may store energy in said spring shaft until sufficient torque has been stored to operate said cam and shutter mechanism.

6. In a shutter for cameras, the combination with an apertured shutter casing, of mechanism in the shutter casing including a spring adapted to be set and released for making an exposure, a lever connected to said spring, a cam mounted adjacent to and adapted to contact with said lever, and a torsionally resilient shaft connected with said cam and passing through the aperture in the casing, a mount for said shaft in which said shaft may turn, and an operating button carried by the shaft exteriorly of the casing for turning said shaft and said cam through the resilient shaft for operating the shutter mechanism.

7. In a shutter for cameras, the combination with an apertured shutter casing, of mechanism in the shutter casing including a spring adapted to be set and released for making an exposure, a lever connected to said spring, a cam mounted adjacent to and adapted to contact with said lever, and a torsionally resilient shaft connected with said cam and passing through the aperture in the casing, a mount for said shaft in which said shaft may turn, said mount engaging a portion only of the shaft permitting at least a portion of the shaft to flex, and an operating button carried by the shaft exteriorly of the casing for operating the shutter mechanism.

8. In a shutter for photographic cameras, the combination with an apertured shutter casing, of mechanism in the shutter for making an exposure including an operating lever, a cam mounted adjacent the lever for contact therewith, a shaft bearing carried by the shutter, a shaft structure mounted in said bearing consisting of a torsionally resilient portion and a rigid portion, the resilient portion including springy material capable of storing up energy and flexing laterally of the bearing, and an operating button carried by the shaft exteriorly of the casing for storing energy in the spring shaft, said cam being fixedly mounted on a rigid portion of the shaft to be actuated thereby.

9. A shutter release for photographic shutters comprising a pair of coaxially arranged parts, one part constituting a trigger for manually actuating the shutter and the other part constituting a member for operating a shutter, a torsionally resilient member forming a shaft connecting the coaxially arranged parts for transmitting rotative movement from the trigger to the shutter actuator after energy has been stored in the torsionally resilient shaft, and a bearing member carried by the shutter engaging a portion of the shaft in which the shaft may turn.

10. A shutter release for photographic shutters comprising a shutter release button, a torsionally resilient shaft, said shutter release button being fixedly attached to one end of the resilient shaft, a bearing rotatably supporting the other end of the flexible shaft whereby the end of the flexible shaft carrying the shutter release button may both turn and move laterally of the shaft as said shaft flexes under the torque manually applied to the button.

11. A shutter release for photographic shutters comprising a shutter release button, a torsionally resilient shaft rotatably mounted in a fixed bearing at one end, the release button being fixedly attached to the unsupported end of the shaft whereby said button may be turned to turn the shaft and may move laterally with the unsupported end of the flexible shaft.

JOSEPH MIHALYI.